(12) United States Patent
Nuttall et al.

(10) Patent No.: US 11,799,544 B1
(45) Date of Patent: Oct. 24, 2023

(54) ASSIGNMENT OF SATELLITE BEAM ALLOCATIONS FOR THE SCHEDULED WIRELESS COMMUNICATION BETWEEN WIRELESS DEVICES AND A BASE STATION

(71) Applicant: Skylo Technologies, Inc., Palo Alto, CA (US)

(72) Inventors: Andrew Nuttall, Mountain View, CA (US); Meghna Agrawal, Cupertino, CA (US); Vijay Lewis, Wylie, TX (US)

(73) Assignee: Skylo Technologies, Inc., Mountain View, CA (US)

( * ) Notice: Subject to any disclaimer, the term of this patent is extended or adjusted under 35 U.S.C. 154(b) by 0 days.

(21) Appl. No.: 17/849,649

(22) Filed: Jun. 26, 2022

Related U.S. Application Data

(60) Provisional application No. 63/348,377, filed on Jun. 2, 2022.

(51) Int. Cl.
*H04W 16/28* (2009.01)
*H04W 56/00* (2009.01)
*H04B 7/185* (2006.01)

(52) U.S. Cl.
CPC ..... *H04B 7/18543* (2013.01); *H04B 7/18547* (2013.01); *H04W 16/28* (2013.01); *H04W 56/006* (2013.01); *H04W 56/0045* (2013.01)

(58) Field of Classification Search
CPC .......... H04B 7/18543; H04B 7/18547; H04W 16/28; H04W 56/0045; H04W 56/006
See application file for complete search history.

(56) References Cited

U.S. PATENT DOCUMENTS

| | | |
|---|---|---|
| 5,790,070 A | 8/1998 | Natarajan et al. |
| 7,636,567 B2 | 12/2009 | Karbinis et al. |
| 2007/0135051 A1 | 6/2007 | Zheng et al. |
| 2010/0184381 A1 | 7/2010 | Zheng et al. |
| 2012/0155378 A1 | 6/2012 | Kim et al. |
| 2019/0123864 A1* | 4/2019 | Zhang .................... H04W 16/28 |
| 2019/0207672 A1* | 7/2019 | Arora ................. H04B 7/18513 |
| 2021/0110266 A1* | 4/2021 | Wang ..................... G06N 3/045 |
| 2023/0118482 A1* | 4/2023 | Chakraborty ...... H04B 7/18539 370/336 |

* cited by examiner

*Primary Examiner* — Ashley Shivers
(74) *Attorney, Agent, or Firm* — Brian R. Short

(57) ABSTRACT

Apparatuses, methods, and systems for a satellite wireless communication system are disclosed. One system includes a base station, a satellite, a beam management controller, and a plurality of wireless devices. The base station is configured to wirelessly communicate according to a schedule between the base station and each of the plurality of wireless devices within a scheduling frame. The satellite is operative to form a plurality of beams between the satellite and the wireless devices and support a wireless satellite link between the base station and the wireless devices through the plurality of beams. The beam management controller is operative to assign beam allocations for the scheduled wireless communication between each of the wireless devices and the base station that is time aligned with the scheduling frame, wherein each of the beam allocations includes an assignment to at least one of the plurality of beams.

23 Claims, 12 Drawing Sheets

Beam management Table

| | Anchor / non-anchor beam | Area covered (e.g. center and radius) | Beam UL freq (service link) | Beam DL Freq (service link) | Time when beam is active | Devices in the beam area |
|---|---|---|---|---|---|---|
| Beam 0 | Anchor beam | A1( r1, lat1, long 1) | ch1 | | based on schedule | all |
| Beam 2 | non-anchor | A2( r1, lat1, long 1) | | | based on schedule | Depends upon location & data demand |
| Beam 3 | non-anchor | A3 | | | based on schedule | Depends upon location & data demand |
| Beam 4 | non-anchor | A4 | | | based on schedule | Depends upon location & data demand |

Figure 11

```
┌─────────────────────────────────────────────────────────────────────────┐
│ Wirelessly communicating, by a base station, according to a schedule    │
│ between the base station and each of a plurality of wireless devices,   │
│ wherein the schedule includes assigned frequency and time allocations   │
│ of the wireless communication between the base station and each of the  │
│ plurality of wireless devices within a scheduling frame                 │
│                              1210                                       │
└─────────────────────────────────────────────────────────────────────────┘
                                    │
                                    ▼
┌─────────────────────────────────────────────────────────────────────────┐
│ Forming, by a satellite, a plurality of beams between the satellite     │
│ and the plurality of wireless devices                                   │
│                              1220                                       │
└─────────────────────────────────────────────────────────────────────────┘
                                    │
                                    ▼
┌─────────────────────────────────────────────────────────────────────────┐
│ Supporting, by the satellite, a wireless satellite link between the     │
│ base station and the plurality of wireless devices through the          │
│ plurality of beams                                                      │
│                              1230                                       │
└─────────────────────────────────────────────────────────────────────────┘
                                    │
                                    ▼
┌─────────────────────────────────────────────────────────────────────────┐
│ Assigning, by a beam management controller, beam allocations for the    │
│ scheduled wireless communication between each of the plurality of       │
│ wireless devices and the base station that is time aligned with the     │
│ scheduling frame, wherein each of the beam allocations includes an      │
│ assignment to at least one of the plurality of beams                    │
│                              1240                                       │
└─────────────────────────────────────────────────────────────────────────┘
```

Figure 12

ASSIGNMENT OF SATELLITE BEAM ALLOCATIONS FOR THE SCHEDULED WIRELESS COMMUNICATION BETWEEN WIRELESS DEVICES AND A BASE STATION

RELATED PATENT APPLICATION

This patent application claims priority to U.S. Provisional Patent Application Ser. No. 63/348,377, filed Jun. 2, 2022, which in herein incorporated by reference.

FIELD OF THE DESCRIBED EMBODIMENTS

The described embodiments relate generally to wireless communications. More particularly, the described embodiments relate to systems, methods, and apparatuses for assignment of satellite beam allocations for the scheduled wireless communication between wireless devices and a base station.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for assignment of satellite beam allocations for the scheduled wireless communication between wireless devices and a base station.

SUMMARY

An embodiment includes a satellite wireless communication system. The system includes a base station, a satellite, a beam management controller, and a plurality of wireless devices. The base station is configured to wirelessly communicate according to a schedule between the base station and each of a plurality of wireless devices, wherein the schedule includes assigned frequency and time allocations of the wireless communication between the base station and each of the plurality of wireless devices within a scheduling frame. The satellite is operative to form a plurality of beams between the satellite and the plurality of wireless devices and support a wireless satellite link between the base station and the plurality of wireless devices through the plurality of beams. The beam management controller is operative to assign beam allocations for the scheduled wireless communication between each of the plurality of wireless devices and the base station that is time aligned with the scheduling frame, wherein each of the beam allocations includes an assignment to at least one of the plurality of beams.

Another embodiment includes a method. The method includes wirelessly communicating, by a base station, according to a schedule between the base station and each of a plurality of wireless devices, wherein the schedule includes assigned frequency and time allocations of the wireless communication between the base station and each of the plurality of wireless devices within a scheduling frame, forming, by a satellite, a plurality of beams between the satellite and the plurality of wireless devices, supporting, by the satellite, a wireless satellite link between the base station and the plurality of wireless devices through the plurality of beams, and assigning, by a beam management controller, beam allocations for the scheduled wireless communication between each of the plurality of wireless devices and the base station that is time aligned with the scheduling frame, wherein each of the beam allocations includes an assignment to at least one of the plurality of beams.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 11 show a beam management table, according to an embodiment.

FIG. 12 is a flow chart that includes steps of a method of satellite wireless communication, according to an embodiment.

DETAILED DESCRIPTION

The embodiments described include methods, apparatuses, and systems for assignment of satellite beam allocations for the scheduled wireless satellite communication between a plurality of wireless devices and a base station. At least some of the described embodiments include one or more base stations communicating with one or more wireless device through a wireless communications link through one or more satellites. For at least some embodiments, the wireless satellite link includes a wireless link between the satellite and the one or more devices that includes one or more beams of one or more beamforming patterns, wherein the wireless link supports or more wireless links between the wireless devices and the satellite through the beamforming patterns.

At least some embodiments include a beam management element configured to assign base station communications to a specific beam pattern (one of a set of prefixed beam patterns) on the satellite system based upon a location of a user terminal (wireless device), the base station protocol (the timing schemes, the frequency/frame allocations), and the data to be communicated. For an embodiment, the deployment of satellite channels and beams are congruent and synchronized in time and frequency with a protocol frame structure. For an embodiment, the data includes data packets, control packets, an SIB (system information block) and/or an MIB (master information block) packet selected for one or more beams, or for a random-access request time/frequency slot of one or more beams.

For an embodiment, the satellite is configured to relay wireless communications between the one or more wireless devices and the base stations. The satellite may be, for example, a LEO/MEO/GEO satellite. Leo satellites are in motion, and for an embodiment, the beam management element accounts for the motion of the satellite when making beam assignments.

For an embodiment, the base station(s) are configured to communicate over a wireless link with the wireless devices at a different times and frequencies as scheduled.

For an embodiment, a mobility management element to maintain, track, and predict the locations of satellites and their associated base stations and user terminals, and to assign data communications based upon this tracking/predicting to a specific base station.

For an embodiment, each wireless device communicates with a base station over a wireless link and may share its location information with the base station.

Figure 1:
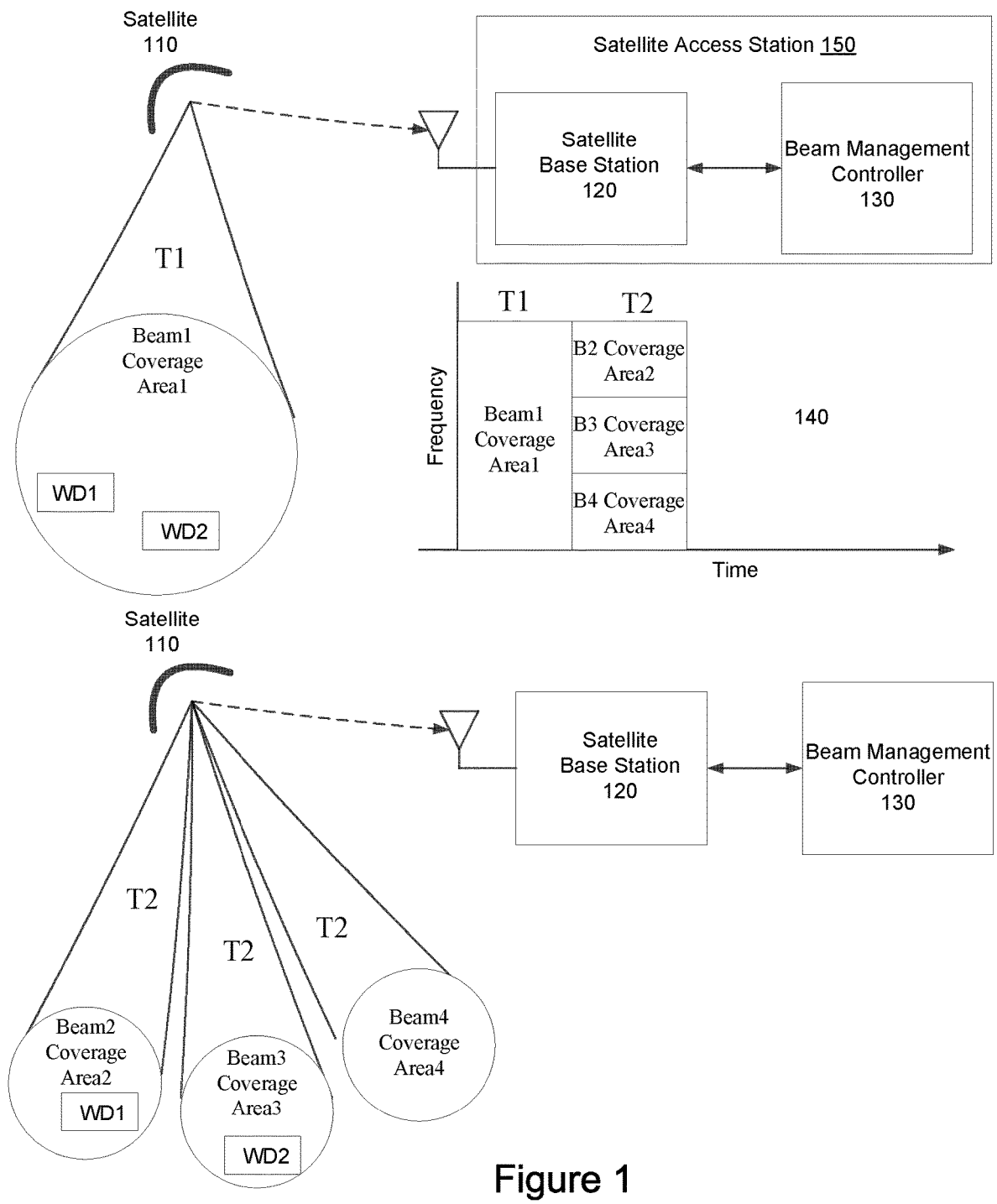
FIG. 1 shows a satellite wireless communication system that includes scheduling of beams of a satellite at times T1 and T2, according to an embodiment.

FIG. 1 shows a satellite wireless communication system that includes scheduling of beams of a satellite at times T1 and T2, according to an embodiment. For an embodiment, a base station 120 is operative to wirelessly communicate according to a schedule 140 between the base station 120 and each of a plurality of wireless devices (such as, wireless devices WD1, WD2), wherein the schedule includes assigned frequency and time allocations of the wireless communication between the base station and each of the plurality of wireless devices within a scheduling frame.

For an embodiment, a satellite 110 is operative to form a plurality of beams between the satellite and the plurality of wireless devices and support a wireless satellite link between the base station 120 and the plurality of wireless devices through the plurality of beams. The wireless satellite link includes both downlink wireless communications from the base station to the wireless device(s), and uplink wireless communications from the wireless device(s) to the base station.

For an embodiment, a beam management controller 130 is operative to assign beam allocations for the scheduled wireless communication between each of the plurality of wireless devices and the base station that is time aligned with the scheduling frame, wherein each of the beam allocations includes an assignment to at least one of the plurality of beams.

As shown, the base station 120 is operable to communicate with wireless devices located within a beam 1 coverage area 1 of a first beam during a first time period T1, and operable to communicate with wireless devices located within a beam 2 coverage area 2, a beam 3 coverage area 3, and a beam 4 coverage area 4 during a second time period T2. For an embodiment, a schedule 140 determines the time and frequency allocations of the wireless communications and includes time and frequency allocations of the beams (beam 1, beam 2, beam 3, beam 4).

Communication Delays

For an embodiment, the beam management controller 130 is configured to control timing of wireless communications between the base station and each of the wireless devices through each of the plurality of beams based on a communication delay associated with each of the beams, and the scheduling frame. For an embodiment, the different beams are associated with different communication channels, wherein each of the communication channels includes different processing electronics, wherein each of the different processing electronics will induce different delay of signals propagating through the different processing electronics, antenna configuration, cables, signal processing if any. For an embodiment, controlling the timing comprises aligning the beam allocations with the scheduling frame based on the communication delay associated with each of the beams. Aligning each of the beams with the scheduling frame results in the beams being aligned with each other.

Wireless Device Locations

For an embodiment, a location of each of the wireless devices is communicated by the wireless device to the base station 120 and beam management controller 130. Further, for an embodiment, the beam assignment allocations for each device for the scheduled wireless communication by the beam management controller 130 is based on the wireless device location. For an embodiment, the location of at least some of the wireless devices is reported by the wireless devices through a wireless link. For an embodiment, the location of at least some of the wireless devices is reported to the management controller 130 over a different network (such as, a terrestrial network. For an embodiment, the location of at least some of the wireless devices is reported to the management controller 130 through an MME (mobility management entity). For an embodiment, the location of at least some of the wireless devices is reported to the management controller 130 by a third-party application.

For at least some embodiments, the location of at least some of the wireless devices is estimated based on a timing advance correction and specific delays of each of the wireless devices, wherein the timing advance correction is determined by the base station measuring timing differences between different wireless devices. For an embodiment, a distance between a satellite and a wireless device is inferred based upon timing advance corrections, wherein the timing advance corrections are controlled delays of transmissions for time aligning transmission for different wireless devices. For an embodiment, to enable the timing advance corrections, the base station measures timing differences between wireless devices, which can be used to imply differences in distance from the wireless devices and the base station. For an embodiment, location accuracy requirements depend on the size of the beam. For an embodiment, location accuracy and variation should be enough to identify the beam in which the device resides. As stated, the timing advance can aid in determining the distance between satellite and a wireless device. For an embodiment, the timing advance along with a beam coverage area can be used to estimate the location of the wireless device. Different beams may have different, but proximate coverage footprints. A determination of which of the coverage footprints the wireless device resides can be estimated based on the distance estimate provided by the timing advance corrections. Once the coverage footprint the wireless device resides in is determined, the beam management controller can properly make the beam assignments.

For at least some embodiments, the location of at least some of the wireless devices is reported through a selection of a preamble code, and mapping of the preamble code for each of the at least some of the wireless devices with location regions. As will be described, for an embodiment, a base station receives wireless signals from beams having multiple (for example 9) separate spatial footprints. The received signals of the 9 beams corresponding with the 9 spatial footprints are correlated with a known preamble signal. The beam that includes the spatial footprint that includes the wireless device of a user will generate a correlation signal, allowing identification of the location of the wireless device of the user. For an embodiment, the location of the wireless device is determined by the satellite enabling all of its non-overlapping smaller beams (for example, 9), receiving a preamble from the wireless device, performing a correlation across all 9 beams to determine the beam with the highest correlation and assigning the wireless device to a cell location based upon that correlation. For an embodiment, the location is reported by the wireless device selection of the preamble, wherein the preamble selection is based on the cell location of the wireless device, thereby enabling the base station to determine the cell location of the wireless device. That is, the base station determines the preamble transmitted by the wireless device through the correlation, and then maps the identified preamble to a specific region or location of the determine cell of the wireless device.

Satellite Ephemeris

For at least some embodiments, a location and coverage areas of each of the plurality of beams are predicted using satellite ephemeris information. For an embodiment, the coverage area of each of the beams are referenced to a geographic cell lay down by the beam management element. As described, for an embodiment, the beam assignments are made base on the footprints of the different beams and the determined locations of the wireless devices. For an embodiment, the locations of the coverage areas are predicted based at least in part on the ephemeris of the satellite.

Figure 2:
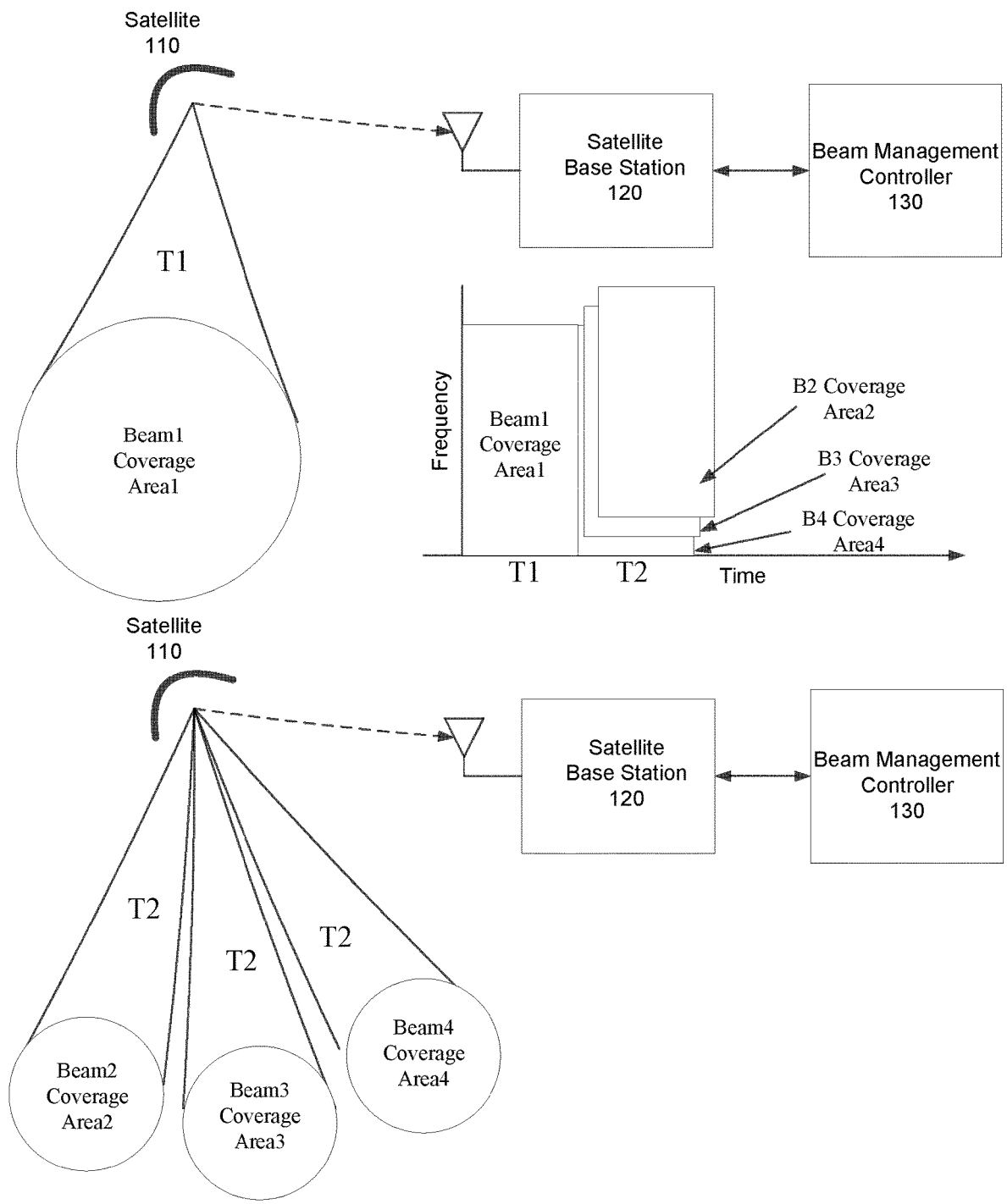
FIG. 2 shows a satellite wireless communication system that includes scheduling of beams of a satellite at times T1 and T2 that include overlapping frequency spectrum, according to an embodiment.

FIG. 2 shows a satellite wireless communication system that includes scheduling of beams of a satellite at times T1 and T2 that include overlapping frequency spectrum, according to an embodiment. As shown, the spatial footprints of the coverage areas of Beam2, Beam3, and Beam4 are spatially non-overlapping. Accordingly, the Beam2, Beam3, and Beam4 are spatially orthogonal. To reduce interference between each of the beams, the beams need to be at least one of spatially, spectrally, temporally, or code orthogonal. Because the beams Beam2, Beam3, and Beam4 are spatially orthogonally, the beam can be scheduled to overlap in time and frequency. However, the Beam1 may not be spatially orthogonal with the beams Beam2, Beam3, and Beam4. Accordingly, the Beam1 would need to be orthogonal with the beams Beam2, Beam3, and Beam4 either spectrally or temporally. That is, the Beam1 needs to be scheduled so that either the frequency or timing of the wireless communications of the Beam1 does not overlap with either the frequency or timing of the wireless communications of the beams Beam2, Beam3, and Beam4.

Spatially orthogonal beams are beams that have non-overlapping spatial footprints or coverage areas. Spectrally orthogonal beams are beams that have wireless communication signals that have non-overlapping frequency spectrums. Temporally orthogonal beams are beams that have wireless communications signals that are non-overlapping in time. Code orthogonal beams are beams that have wireless communications signals that are coded orthogonally.

Figure 3:
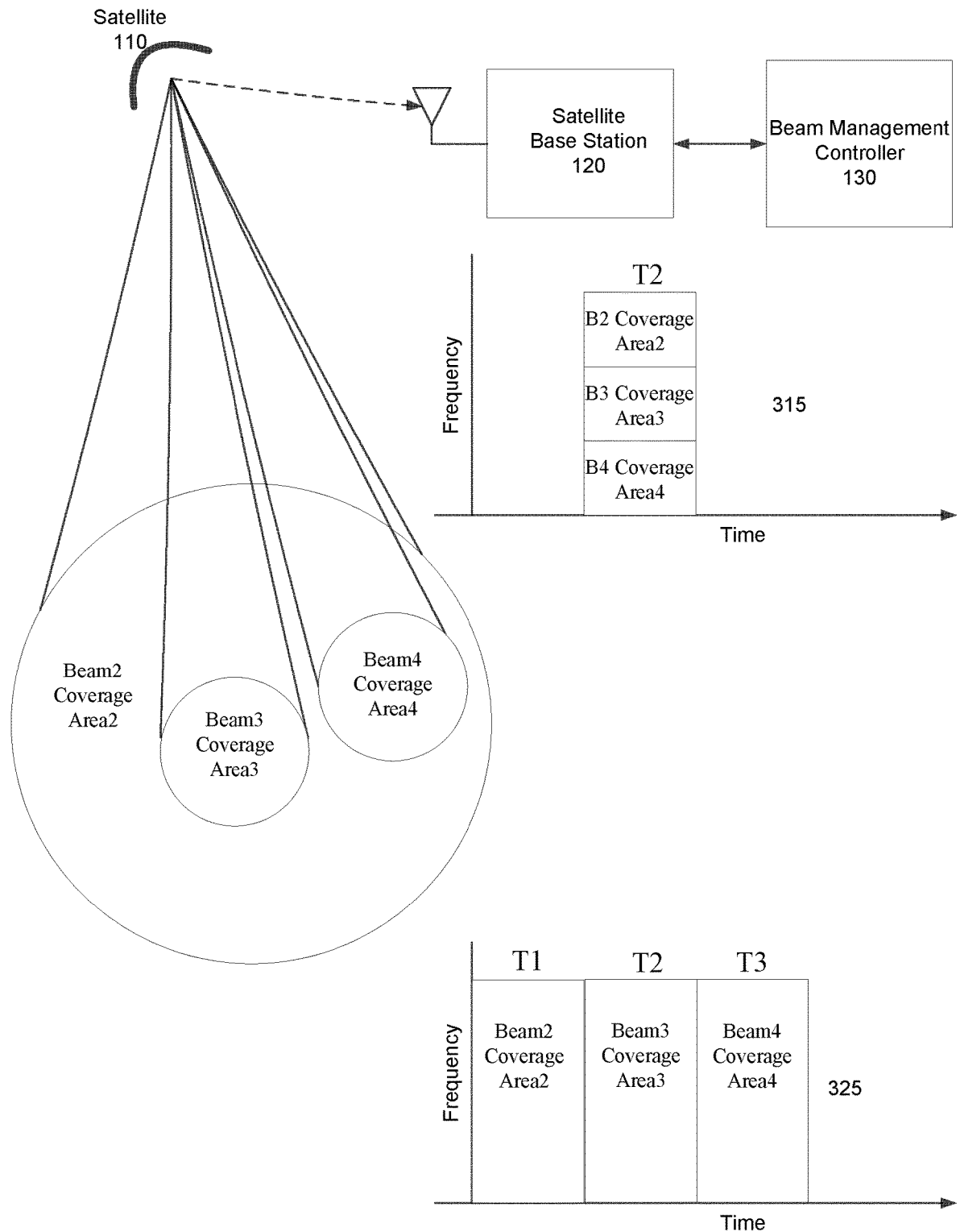
FIG. 3 shows a satellite wireless communication system that includes scheduling of beams of a satellite at times T1 and T2 that include overlapping spatial footprints, according to an embodiment.

FIG. 3 shows a satellite wireless communication system that includes scheduling of beams of a satellite at times T1 and T2 that include overlapping spatial footprints, according to an embodiment. As shown, the spatial footprint of the Beams2 overlaps with the footprints of the beams Beam3 and Beam4. Accordingly, Beam 2 needs to be scheduled to not overlap in frequency or time with the beams Beam3 and Beam4. Schedule 315 shows Beam2 not overlapping in frequency with the beams Beam3 and Beam4. Schedule 325 shows Beam2 not overlapping in time with the beams Beam3 and Beam4. It is to be noted that Beam3 is spatially orthogonal with Beam4 (that is, the two beams do not have footprints that spatially overlap). Therefore, Beam3 and Beam4 could have been scheduled to overlap in time or frequency.

Figure 4:
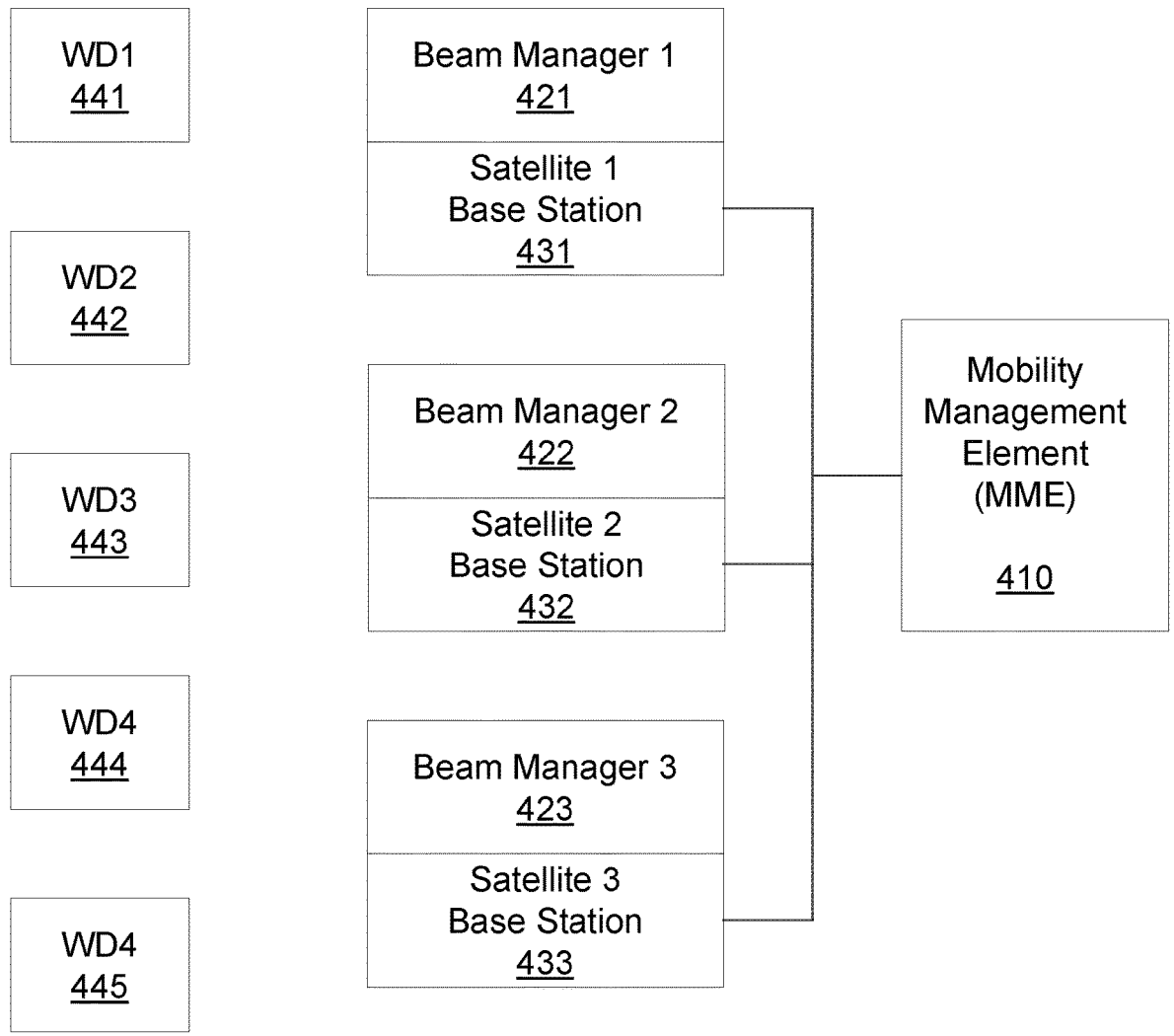
FIG. 4 shows a satellite wireless communication system that includes base stations, wireless devices, beam managers and a mobility management element, according to an embodiment.

FIG. 4 shows a satellite wireless communication system that includes base stations, wireless devices, beam managers and a mobility management element, according to an embodiment. For an embodiment, the mobility management element is configured to obtain (maintains/predicts/receives) information of locations of spatial footprints of beams of each of the plurality of satellites, and a location of the at least one of the plurality of wireless devices, and route information to at least one of the base stations based on the obtained information. For an embodiment, the mobility management system uses the obtained information to map wireless devices to coverage areas of beams and cells.

For an embodiment, the routed information to the base station is further assigned to at least one of the plurality of beams and the beam assignment is aligned with the scheduling frame by the beam management controller.

As previously described, for an embodiment, at least one spatial footprint of at least one of the plurality of beams overlaps with at least one other spatial footprint of at least one other of the plurality of beams. Further, as previously described, wireless communications of beams having overlapping spatial footprints are at least one of frequency, time, or code orthogonal to reduce interference between the overlapping beams.

Figure 5:
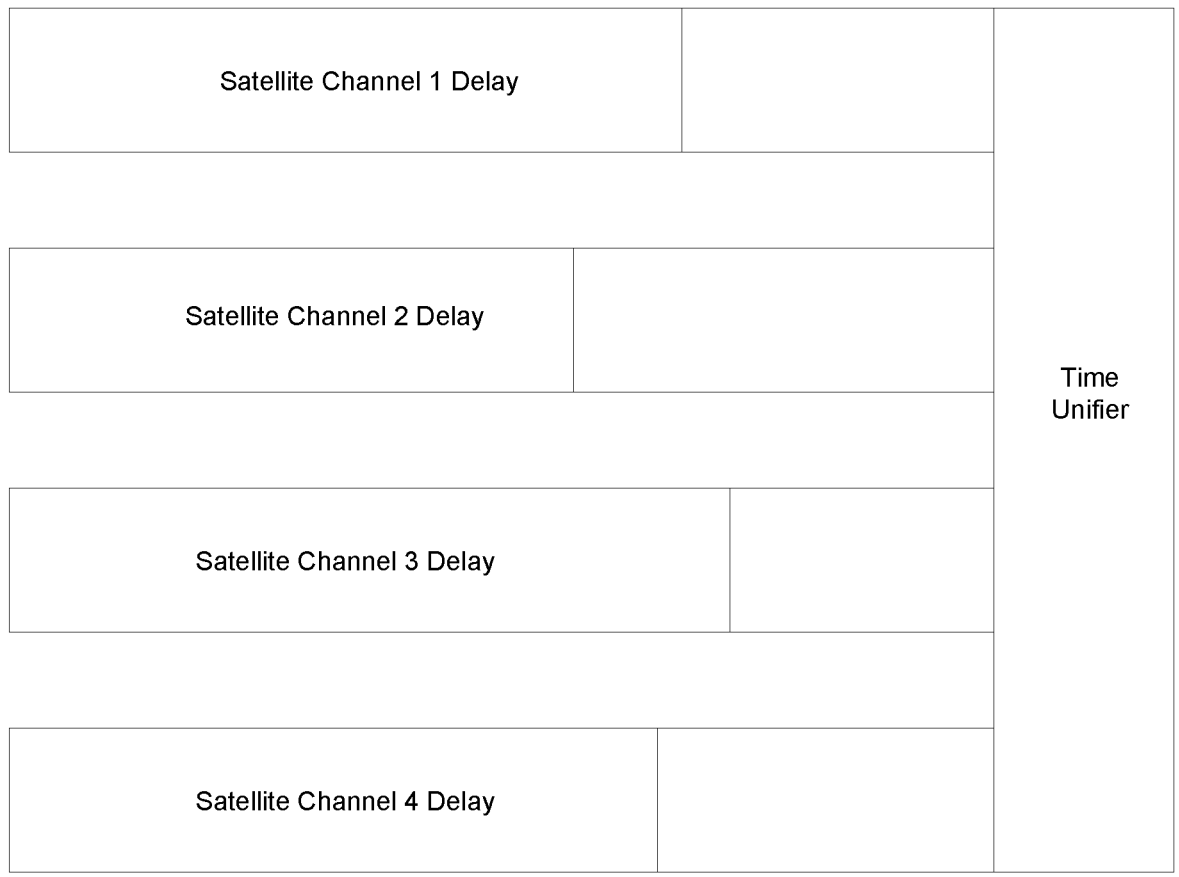
FIG. 5 is a timing diagram that shows synchronization of signals having different delays associated with different channels of different beams of a satellite wireless communication system, according to an embodiment.

FIG. 5 is a timing diagram that shows synchronization of signals having different delays associated with different channels of different beams of a satellite wireless communication system, according to an embodiment. For an embodiment, different beams (channels) of a satellite will have different propagation delays. For an embodiment, the propagation delays are due to processing electronics. To compensate for the different delays, the schedule can include different controlled delays for each of the different channels for the purpose of synchronizing the wireless communications through the different channels. An embodiment includes controlling timing of wireless communications between the base station and each of the wireless devices through each of the plurality of beams based on a propagation delay associated with each of the beams, the scheduling frame, and a location of the satellite. For an embodiment, frequency and phase offset corrections for different beams are based upon calibrated characteristics of the received channels for different beams, such that the signals received by the wireless device from different beams is frequency and phase aligned within a margin.

Figure 6:
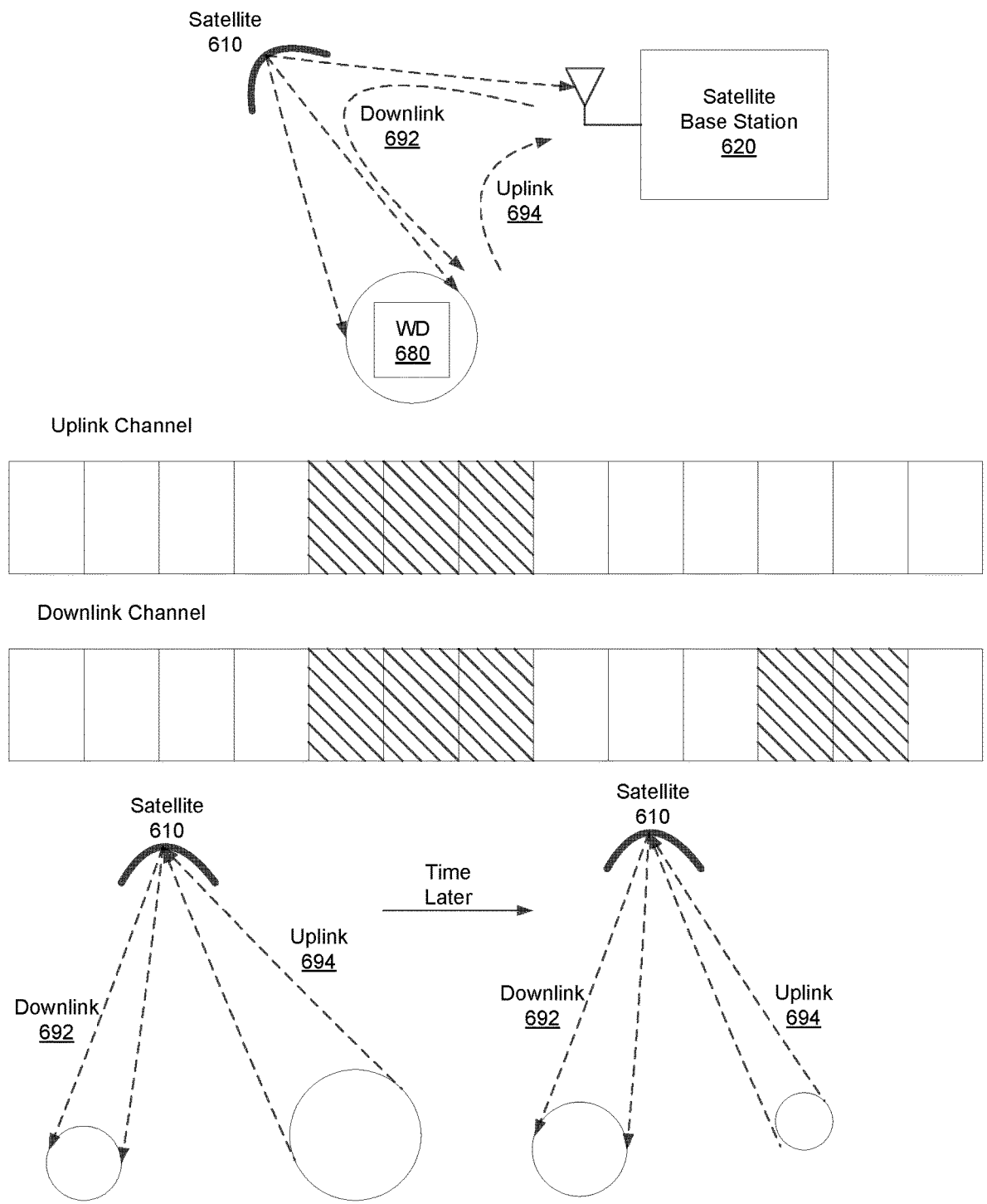
FIG. 6 shows timing diagrams of uplink and downlink satellite wireless communication that includes narrow and wide beams, according to an embodiment.

FIG. 6 shows timing diagrams of uplink and downlink satellite wireless communication that includes narrow and wide beams, according to an embodiment. The uplink and downlink schedules shown in FIG. 6 illustrate that the uplink 694 and downlink 692 schedules can be selected or determined independently. Further, the beam assignments of the schedules can change over time.

Figure 7:
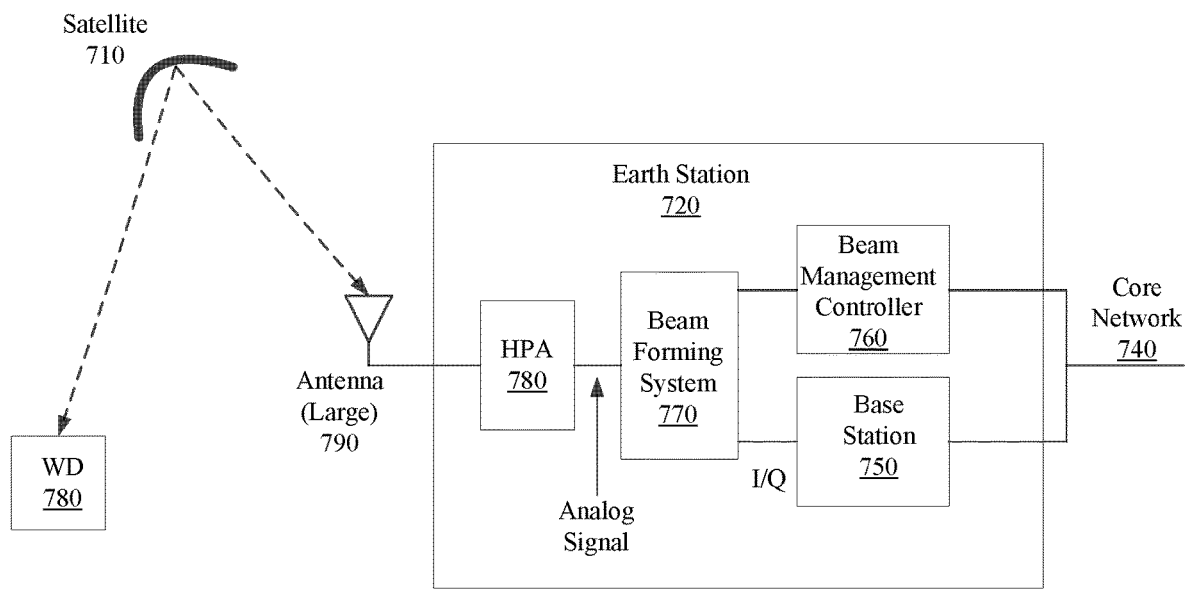
FIG. 7 shows an earth station that includes a beam management controller and a base station, according to an embodiment.

FIG. 7 shows an earth station 720 that includes a beam management controller 760 and a base station 750, according to an embodiment. For this embodiment, the beam management controller 760 and the base station 750 of the earth station are connected to a core network 740. A beamforming system 770 generates coefficients of signals connected to a power amplifier 780 and an antenna array 790. Wireless signals are communicated with a wireless device (WD) 780 through a satellite 710.

Figure 8:
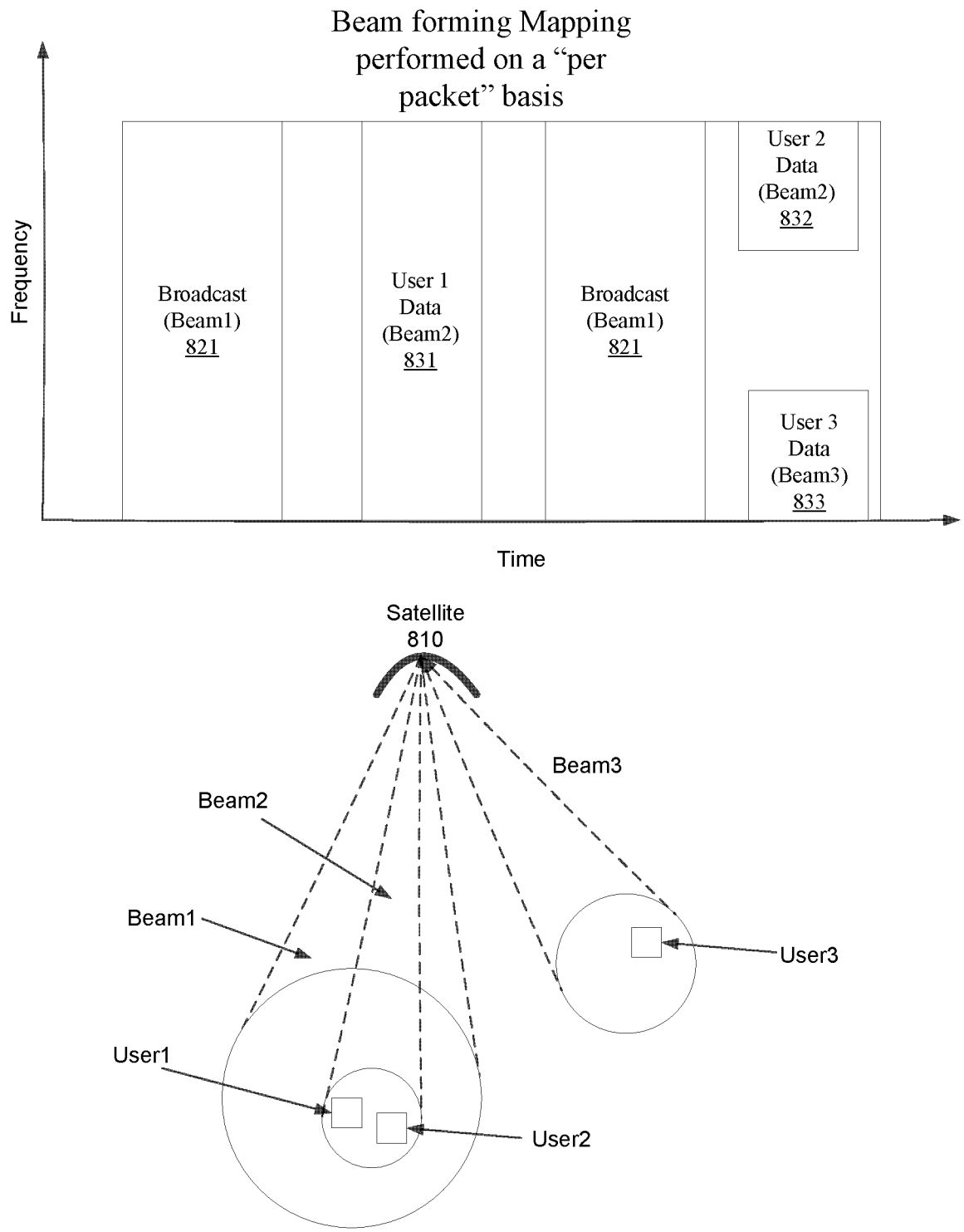
FIG. 8 shows a schedule that allocates beam assignment mapping on a per packet basis, according to an embodiment.

FIG. 8 shows a schedule that allocates beam assignment mapping on a per packet basis, according to an embodiment. As shown, a Beam1 includes an SIB (system information block) 821 scheduled at a first time. A Beam 2 includes user 1 data 831. Further, at another time and frequency, the beam2 includes user 2 data 832 and beam 3 includes user 3 data 833. Further, as shown, for an embodiment, the spatial footprint of Beam 1 spatially overlaps with the Beam 2 of the user 1 data 831 and the user 2 data 832. As previously described, spatially overlapping spatial footprints need to be scheduled to be at least one of frequency, time, or code orthogonal.

Figure 9:
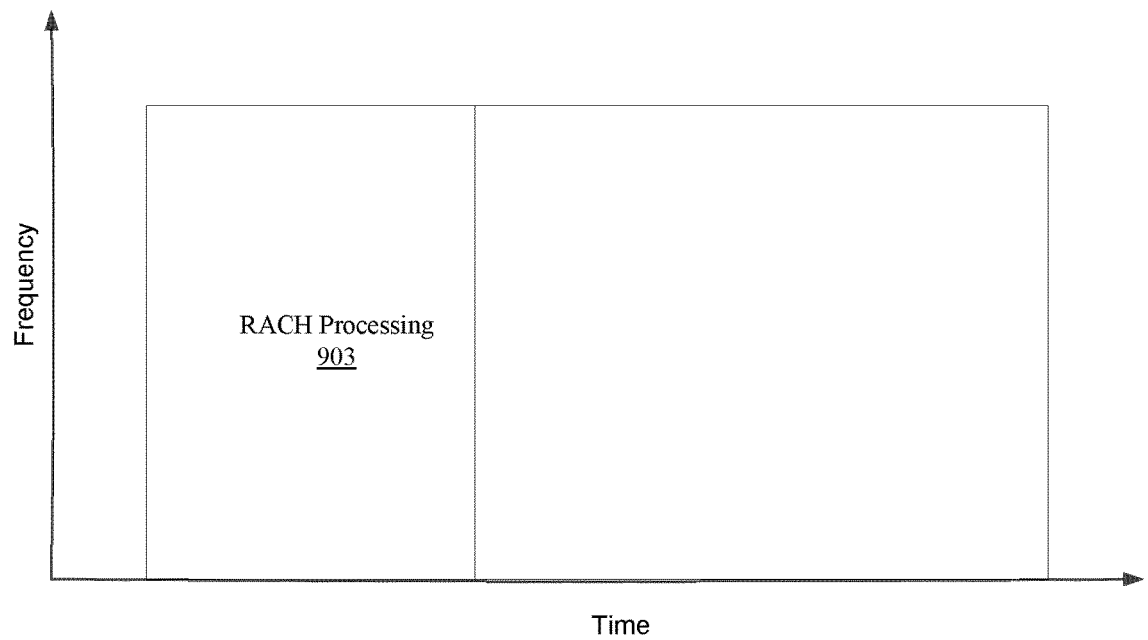
FIG. 9 shows a satellite wireless communication system that determines a location of a user device, according to an embodiment.
Figure 9:
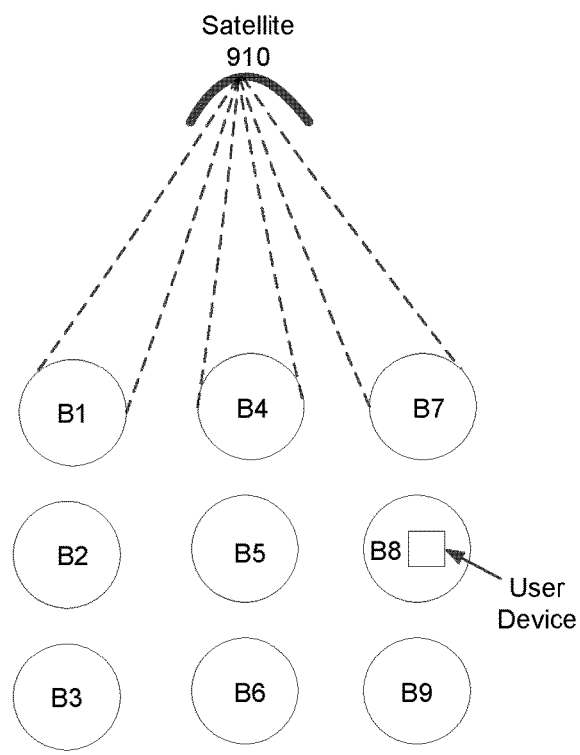
Figure 9:
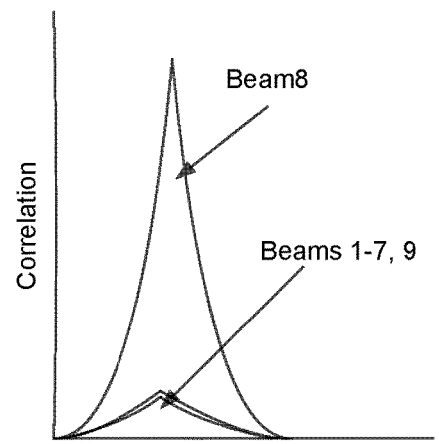

FIG. 9 shows a satellite wireless communication system that determines a location of a user device, according to an embodiment. As previously described, for an embodiment, the assignment of beams is dependent on the spatial footprints of the different beams and the location of the wireless device of the wirelessly communication. FIG. 9 shows a wireless device in which a location of the wireless device is determined during RACH (random access channel) processing 903. More specifically, a base station receives wireless signals from beams having multiple (9 shown) separate spatial footprints. The received signals of the 9 beams corresponding with the 9 spatial footprints are correlated with a known preamble signal. The beam that includes the spatial footprint that includes the wireless device of a user will generate a correlation signal, allowing identification of the location of the wireless device of the user. For an embodiment, the location of the wireless device is determined by the satellite enabling all of its non-overlapping smaller beams (for example, 9), receiving a preamble from the wireless device, performing a correlation across all 9 beams to determine the beam with the highest correlation and assigning the wireless device to a cell location based upon that correlation.

Figure 10:
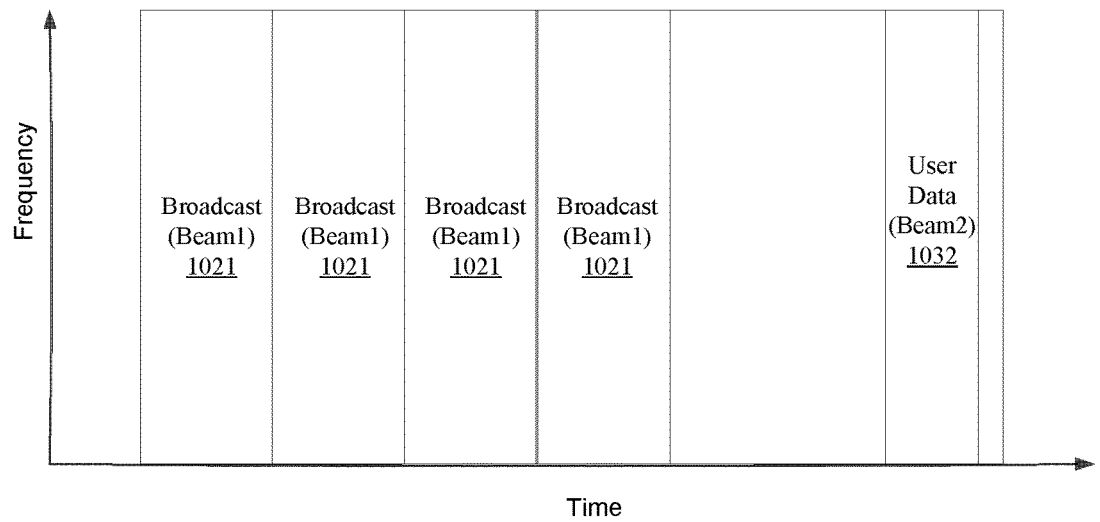
FIG. 10 shows a schedule that includes a greater time allocation to wider beams that have lower transmission signal power than to narrower beams that have higher transmission signal power, according to an embodiment.
Figure 10:
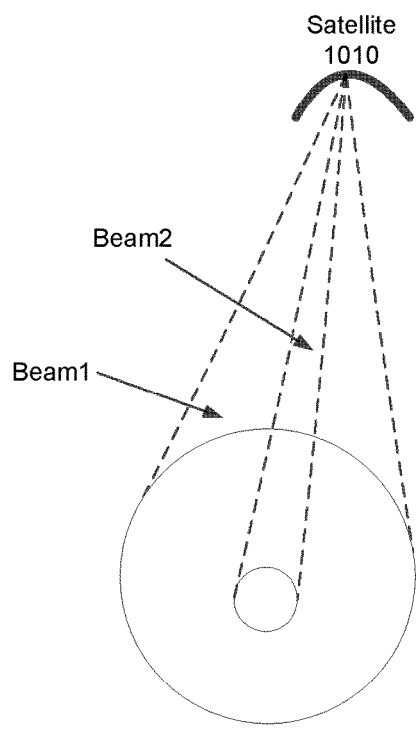
Figure 10:
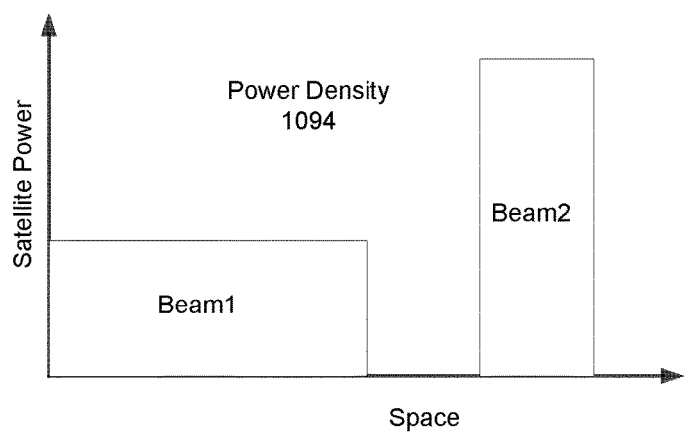

FIG. 10 shows a schedule that includes a greater time allocation to wider beams that have lower transmission signal power than to narrower beams that have higher transmission signal power, according to an embodiment. Typically, wider width beams will have a lower signal power density due to the greater spatial coverage of the wider beam. For an embodiment, an SIB (system information block) can be transmitted using a beam with a wider beam coverage (since this is a broadcast frame and is received by many devices) and user data block can be transmitted using narrow beam (based upon the location and chosen beam for the wireless device). FIG. 10 shows that for an embodiment, the wider beam (Beam1) of the SIB block 1021 may include more time slots (greater time duration) than a narrower beam (Beam2) of a data block. 1032. The narrower beam will cover a smaller spatial area, and naturally have a higher power density. For an embodiment, the power density of the Beam1 can be increased by increasing the duration of SIB time slots or time duration. For an embodiment, SIB and other packets transmitted using wider beams can use repetition (repeated transmissions) and a lower modulation scheme to increase the robustness of the channel even when power density is low. For an embodiment, data packets can use lower repetitions and higher modulation schemes by leveraging a higher power density.

For an embodiment, the SIB Beam1 1021 is wider (greater spatial area) and overlaps with the narrower user data Beam2 1032. For an embodiment, the beams are created at the satellite 1010.

Anchor and Non-Anchor Channels

For an embodiment, the satellite converts spatial orthogonality to spectral orthogonality and vice versa. Specifically, the satellite converts spatial orthogonality of the link (user link) between the satellite and the wireless devices to spectral orthogonality for the link (feeder link) between the satellite and the base station. As previously shown and described, wireless links having spatial orthogonal beams have non-overlapping spatial footprints. Wireless links that are spectrally orthogonal have non-overlapping frequency spectrums. This allows for multiple parallel channels to be run over a cell definition. In some instances, multiple channels over a coverage area are managed as an anchor channel with one or more non-anchor channels. For an embodiment, anchor channels carry control, synchronization, and other communication facilitating data in addition to user data, while non-anchor carriers only carry user data. For an embodiment, the beam management element assigns beams of the anchor and non-anchor channel for the communication based on a type of communication and wireless device locations and provides the assignments to the base station.

FIG. 11 show a beam management table, according to an embodiment. As shown, the beam management table includes the mapping of anchor/non anchor channels to the beams along with the channel and schedule during which the beams are active. The beam management table can also include the devices present in a particular beam. For an embodiment, the devices list is updated based on the latest location information of the wireless device and the time of last communication with the wireless device.

Packet Classification

For an embodiment, a packet classification of packets of the wireless communication influences the assigning of beam allocations. For an embodiment, a packet having a packet classification indicating the packet is to be broadcast is assigned a wider beam than a packet having a packet classification indicating the packet is a focused data packet, the includes a focused, narrow beam targeted for one or a small number of wireless devices. For an embodiment, the packet classification includes at least one of a data bandwidth requirement, an SINR requirement, a duration of communication of wireless communications associated with the packet, and/or number (single of many) of recipients (wireless devices).

Transmit Power Levels and Receive Signal Sensitivities

For an embodiment, different of the assigned beams of the scheduled communication are allocated different transmit power levels and different receive signal sensitivities. For an embodiment, different beams may have different transmit powers and receive sensitivities associated with them. For example, if Beam A is selected then the beam management system increases the amplitude of the I/Q samples by X dB.

For an embodiment, the beam management system allocates beams based upon a type of the scheduled communication. Further, for at least some embodiments, the beam management system allocated beams based on bandwidth, SINR requirement, duration of communication.

Frame Position

For an embodiment, assigning beam allocations for the scheduled communication is based on a frame position of a packet of the wireless communications within a protocol frame structure. For an embodiment, the beam assignment is based upon a current frame position in the protocol frame structure. For an embodiment, timing of the switching from one beam to another depends upon the current frame position in the protocol frame structure. For example, a beam switching time and error margin in the switching time can be based upon the protocol cyclic prefix length. For an embodiment, the cyclic prefix is created to prevent inter-symbol interference (ISI) when an OFDM signal is transmitted in a dispersive channel. For an embodiment, the beam assignment switching time is based upon the protocol cyclic prefix length. For an embodiment, the beam allocation is frame aligned within a time delta of the protocol frame structure, and the beam allocation is based upon the schedule dictated by beam management system based upon the wireless communication schedule and a mobility management element.

For an embodiment, a location manager works with the mobility management element to route data packets to right base station based on a known/predicted of the location of the wireless device location and based on a known/predicted satellite location.

For an embodiment, the base station changes IF (intermediate frequency) frequency to facilitate the beam manager. For an embodiment, the beam management controller is included within the base station.

For an embodiment, the beam management controller schedule beams to limit (or minimize) the number of beam hops, wherein a beam hop is a change from one beam to another. Reducing the beam hopping provides for more efficient utilization of wireless communication between the base station and the wireless device. For an embodiment, this includes maximizing the time duration of each of the beam assignments.

For an embodiment, if a wireless device is within the coverage areas of multiple beams, then the beam assignments can additionally be selected based on an expected received SINR for different beams and beam utilization. The beam utilization depends upon the available and occupied frequency and time slots of a given beam.

FIG. 12 is a flow chart that includes steps of a method of satellite wireless communication, according to an embodiment. A first step 1210 includes wirelessly communicating, by a base station, according to a schedule between the base station and each of a plurality of wireless devices, wherein the schedule includes assigned frequency and time allocations of the wireless communication between the base station and each of the plurality of wireless devices within a scheduling frame. A second step 1220 includes forming, by a satellite, a plurality of beams between the satellite and the plurality of wireless devices. A third step 1230 includes supporting, by the satellite, a wireless satellite link between the base station and the plurality of wireless devices through the plurality of beams. A fourth step 1240 includes assigning, by a beam management controller, beam allocations for the scheduled wireless communication between each of the plurality of wireless devices and the base station that is time aligned with the scheduling frame, wherein each of the beam allocations includes an assignment to at least one of the plurality of beams.

As previously described, for an embodiment, the beam management controller control timing of wireless communications between the base station and each of the wireless devices through each of the plurality of beams based on a communication delay associated with each of the beams, and the scheduling frame. For an embodiment, controlling the timing comprises aligning the beam allocations with the scheduling frame based on the communication delay associated with each of the beams.

As previously described, for an embodiment, a location of each of the wireless devices is communicated by the wireless device to the base station and beam management controller, and wherein the assigned beam allocations for each wireless device for the scheduled wireless communication by the beam management controller is based on the location of the wireless device. For an embodiment, the location of at least some of the wireless devices is reported by the wireless device through a wireless link. For an embodiment, the location of at least some of the wireless devices is estimated based on a timing advance correction and specific delays of each of the wireless devices, wherein the timing advance correction is determined by the base station measuring timing differences between different wireless devices. For an embodiment, the location is of at least some of the wireless devices is reported through a selection of a preamble code, and mapping of the preamble code for each of the at least some of the wireless devices with spatial footprints of each of the plurality of beams.

As previously described, for an embodiment, a location and coverage area of each of the plurality of beams are predicted using satellite ephemeris information. For an embodiment, the coverage area of each of the beams are referenced to a geographic cell laid down by a beam management element.

At least some embodiment further includes a plurality of base stations including the base station, a plurality of satellites including the satellite, and a mobility management element. As previously described, the mobility management element is configured to obtain information of locations of spatial footprints of beams of each of the plurality of satellites, and a location of at least one of the plurality of wireless devices, and route information between the at least one of the plurality of wireless devices and at least one of the base stations based on the obtained information. For an embodiment, the routed information is assigned to at least one of the plurality of beams and the beam assignment is aligned with the scheduling frame by the beam management controller. For an embodiment, at least one spatial footprint of at least one of the plurality of beams overlaps with at least one other spatial footprint of at least one other of the plurality of beams. For an embodiment, wireless communications of beams having overlapping spatial footprints carry wireless communication signals that are at least one of frequency orthogonal, time orthogonal, or code orthogonal. For an embodiment, spatial orthogonality of a user link is converted into spectral orthogonality by the satellite for a feeder link, wherein the use link comprises a wireless link between the wireless device and the satellite, and the feeder link comprises a wireless link between the satellite and the base station.

For an embodiment, the plurality of beams comprises at least one anchor channel and a set of non-anchor channels as designated by the mobility management element, wherein the mobility management element and the base station can use anchor and non-anchor channels to schedule wireless communication for the user link. For an embodiment, at least one wider beam has a spatial footprint that has an overlapping area that overlaps with spatial footprints of multiple other beams, wherein the base station broadcasts information through the at least one wider beam to wireless devices located in the overlapping area.

For an embodiment, the mobility management element determines information about a location of a satellite, available and active beams of the satellite, spatial footprints of the active beams, and a location of a wireless device and uses this information to route data to the appropriate base station and through an assigned beam to communicate with the wireless device.

As previously described, for an embodiment, assigning beam allocations for the scheduled communication for downlink wireless communications from the base station to the plurality of wireless devices is independent from assigning beam allocations for the scheduled communication for uplink wireless communications from the plurality of wireless devices to the base station.

As previously described, for an embodiment, a packet classification of packets of the wireless communication influences the assigning of beam allocations. For an embodiment, a packet having a packet classification indicating the packet is to be broadcast is assigned a wider beam than a packet having a packet classification indicating the packet is a focused data packet. For an embodiment, the packet classification includes at least one of a data bandwidth requirement, an SINR requirement, or a duration of communication of wireless communications associated with the packet.

As previously described, for an embodiment, assigning beam allocations for the scheduled communication is based on a frame position of a packet of the wireless communications within a protocol frame structure.

As previously described, for an embodiment, different of the assigned beams of the scheduled communication are allocated different transmit power levels and different receive signal sensitivities.

Although specific embodiments have been described and illustrated, the embodiments are not to be limited to the specific forms or arrangements of parts so described and illustrated. The described embodiments are to only be limited by the claims.

What is claimed:

1. A satellite wireless communication system, comprising:
   a base station operative to:
      wirelessly communicate according to a schedule between the base station and each of a plurality of wireless devices, wherein the schedule includes assigned frequency and time allocations of the wireless communication between the base station and each of the plurality of wireless devices within a scheduling frame;
   a satellite operative to:
      form a plurality of beams between the satellite and the plurality of wireless devices;
      support a wireless satellite link between the base station and the plurality of wireless devices through the plurality of beams;
   a beam management controller operative to:
      assign beam allocations for the scheduled wireless communication between each of the plurality of wireless devices and the base station that is time aligned with the scheduling frame, wherein each of the beam allocations includes an assignment to at least one of the plurality of beams; and
      control timing of wireless communications between the base station and each of the wireless devices through each of the plurality of beams comprising aligning the beam allocations with the scheduling frame based on a communication delay associated with each of the beams.

2. The satellite wireless communication system of claim 1,
   wherein the beam management controller is further operative to:
      control timing of the wireless communications between the base station and each of the wireless devices through each of the plurality of beams based on the communication delay associated with each of the beams; and the scheduling frame.

3. The satellite wireless communication system of claim 1, wherein a location of each of the wireless devices is communicated by the wireless device to the base station and beam management controller, and wherein the assigned beam allocations for each wireless device for the scheduled wireless communication by the beam management controller is based on the location of the wireless device.

4. The satellite wireless communication system of claim 3, wherein the location of at least some of the wireless devices is reported by the wireless device through a wireless link.

5. The satellite wireless communication system of claim 3, wherein the location of at least some of the wireless devices is estimated based on a timing advance correction and specific delays of each of the wireless devices, wherein the timing advance correction is determined by the base station measuring timing differences between different wireless devices.

6. The satellite wireless communication system of claim 3, wherein the location is of at least some of the wireless devices is reported through a selection of a preamble code, and mapping of the preamble code for each of the at least some of the wireless devices with spatial footprints of each of the plurality of beams.

7. The satellite wireless communication system of claim 1, wherein a location and coverage area of each of the plurality of beams are predicted using satellite ephemeris information.

8. The satellite wireless communication system of claim 7, wherein the coverage area of each of the beams are referenced to a geographic cell laid down by a beam management element.

9. The satellite wireless communication system of claim 1, further comprising:
   a plurality of base stations including the base station;
   a plurality of satellites including the satellite;
   wherein a mobility management element is configured to:
      obtain information of locations of spatial footprints of beams of each of the plurality of satellites, and a location of at least one of the plurality of wireless devices; and
      route information between the at least one of the plurality of wireless devices and at least one of the base stations based on the obtained information.

10. The satellite wireless communication system of claim 9, wherein the routed information is assigned to at least one of the plurality of beams and the beam assignment is aligned with the scheduling frame by the beam management controller.

11. The satellite wireless communication system of claim 9, wherein at least one spatial footprint of at least one of the plurality of beams overlaps with at least one other spatial footprint of at least one other of the plurality of beams.

12. The satellite wireless communication system of claim 11, wherein wireless communications of beams having overlapping spatial footprints carry wireless communication signals that are at least one of frequency orthogonal, time orthogonal, or code orthogonal.

13. The satellite wireless communication system of claim 12, wherein spatial orthogonality of a user link is converted into spectral orthogonality by the satellite for a feeder link, wherein the use link comprises a wireless link between the wireless device and the satellite, and the feeder link comprises a wireless link between the satellite and the base station.

14. The satellite wireless communication system of claim 13, wherein the plurality of beams comprises at least one anchor channel and a set of non-anchor channels as designated by the mobility management element, wherein the mobility management element and the base station can use anchor and non-anchor channels to schedule wireless communication for the user link.

15. The satellite wireless communication system of claim 13, where at least one wider beam has a spatial footprint that has an overlapping area that overlaps with spatial footprints of multiple other beams, wherein the base station broadcasts information through the at least one wider beam to wireless devices located in the overlapping area.

16. The satellite wireless communication system of claim 9 wherein the mobility management element determines information about a location of a satellite, available and active beams of the satellite, spatial footprints of the active beams, and a location of a wireless device and uses this information to route data to the appropriate base station and through an assigned beam to communicate with the wireless device.

17. The satellite wireless communication system of claim 1, wherein assigning beam allocations for the scheduled communication for downlink wireless communications from the base station to the plurality of wireless devices is independent from assigning beam allocations for the scheduled communication for uplink wireless communications from the plurality of wireless devices to the base station.

18. The satellite wireless communication system of claim 1, wherein a packet classification of packets of the wireless communication influences the assigning of beam allocations.

19. The satellite wireless communication system of claim 18, wherein a packet having a packet classification indicating the packet is to be broadcast is assigned a wider beam than a packet having a packet classification indicating the packet is a focused data packet.

20. The satellite wireless communication system of claim 18, wherein the packet classification includes at least one of a data bandwidth requirement, an SINR requirement, or a duration of communication of wireless communications associated with the packet.

21. The satellite wireless communication system of claim 1, wherein assigning beam allocations for the scheduled communication is based on a frame position of a packet of the wireless communications within a protocol frame structure.

22. The satellite wireless communication system of claim 1, wherein different of the assigned beams of the scheduled communication are allocated different transmit power levels and different receive signal sensitivities.

23. A method, comprising:
wirelessly communicating, by a base station, according to a schedule between the base station and each of a plurality of wireless devices, wherein the schedule includes assigned frequency and time allocations of the wireless communication between the base station and each of the plurality of wireless devices within a scheduling frame;
forming, by a satellite, a plurality of beams between the satellite and the plurality of wireless devices;
supporting, by the satellite, a wireless satellite link between the base station and the plurality of wireless devices through the plurality of beams; and
assigning, by a beam management controller, beam allocations for the scheduled wireless communication between each of the plurality of wireless devices and the base station that is time aligned with the scheduling frame, wherein each of the beam allocations includes an assignment to at least one of the plurality of beams; and
control timing of wireless communications between the base station and each of the wireless devices through each of the plurality of beams comprising aligning the beam allocations with the scheduling frame based on a communication delay associated with each of the beams.

* * * * *